United States Patent [19]

Garner

[11] 3,955,029

[45] May 4, 1976

[54] PROCESS FOR MAKING FLAME RETARDANT MATERIAL

[75] Inventor: Albert Y. Garner, Yellow Springs, Ohio

[73] Assignee: Monsanto Research Corporation, St. Louis, Mo.

[22] Filed: July 22, 1974

[21] Appl. No.: 490,609

[52] U.S. Cl................................. 428/277; 252/8.1; 423/300; 423/302; 427/384; 427/394; 427/395; 427/396; 428/270; 428/272; 428/310; 428/480; 428/921
[51] Int. Cl.²......................................... C09K 3/28
[58] Field of Search............................ 117/138, 136; 106/15 FP; 252/8.1; 423/300, 302; 428/921, 270, 272, 277, 310, 480; 427/384, 394, 395, 396

[56] References Cited
UNITED STATES PATENTS

| | | | |
|---|---|---|---|
| 2,782,133 | 2/1957 | Vallette ............................. | 117/138 |
| 3,012,908 | 12/1961 | Bilger................................ | 117/137 |
| 3,193,571 | 7/1965 | Bilger................................ | 117/136 X |
| 3,685,974 | 8/1972 | Silvestri .......................... | 117/136 X |
| 3,754,982 | 8/1973 | Chapin............................. | 117/138 X |
| 3,799,738 | 3/1974 | Wagner............................ | 428/921 X |

OTHER PUBLICATIONS

Becke–Goehring et al., Z. Anorg. Allgem. Chemie, Vol. 333 (1964), p. 128.

*Primary Examiner*—Ralph Husack
*Attorney, Agent, or Firm*—Bruce Stevens

[57] ABSTRACT

The new product, a $Cl_3P=N-N=PCl_3 + NH_3$ reaction product, has been found to be an excellent flameretardant for material made from cellulose such as cotton, paper and sponge; polyester, wool and blends thereof. Conveniently the material can be treated with an aqueous solution containing a sufficient amount of the product and the material dried to make the material self-extinguishing. Then the treated and dried material is cured at a sufficient temperature to bond the product to the material. Alternatively, and usually preferably, the drying and curing can be accomplished as a single operation.

9 Claims, No Drawings

PROCESS FOR MAKING FLAME RETARDANT MATERIAL

BACKGROUND OF THE INVENTION

Field of the Invention

Fireproofing.

Description of the Prior Art

The prior art teaches a number of phosphorus-nitrogen compounds as flame retardants for various textile materials. Many of these known flame retardants are also treated with formaldehyde or trimethylolamine and a catalyst to give permanence to the bond of the phosphorus-nitrogen compound to the textile material against removal by washing; otherwise, much of the flame retardant property is lost as the material is periodically cleaned by detergent washing. The phosphorus-nitrogen compound of this invention apparently does not require this formaldehyde or the like treatment to be resistant to removal from the textile by detergent washing.

One of the older patents in this art is U.S. Pat. No. 2,782,133 teaching aminocyclophosphazene as a fireproofing agent for cellulosic fibers such as cotton. A recent patent is U.S. Pat. No. 3,711,542 teaching certain new N-methylol phosphazene compounds as flame retardants on cotton, and this patent under Background of the Invention contains a summary of certain phosphazene prior art on flameproofing.

SUMMARY OF THE INVENTION

The new product a $Cl_3P=N—N=PCl_3+NH_3$ reaction product has been found to be an excellent flame-retardant for material made from cellulose, such as cotton, paper and sponge; polyester, wool and blends thereof. Conveniently the material can be treated with an aqueous solution containing a sufficient amount of the product and the material dried to make the material self extinguishing. Then the treated and dried material is cured at a sufficient temperature to bond the product to the material. Alternatively and usually preferably, the drying and curing can be accomplished as a single operation.

DESCRIPTION OF THE PREFERRED EMBODIMENTS

Preparation of $Cl_3P=N—N=PCl_3+NH_3$ reaction product

This product shows excellent promise as a durable fire retardant for cotton, 65/35 polyester-cotton, 100% polyester and wool. It undergoes laundering successfully whether formulated with formaldehyde or aminoplasts or used alone; however, conventional formulation agents such as these may extend the number of times that the material can be laundered and still retain sufficient fire retardant properties.

The trichlorophosphazene precursor for this material is known and has been well characterized (M. Becke-Goehring, and W. Weber, Z. Anorg. Allgem. Chemie, 333, 128 (1964). The aminated product is unknown and is a new product. The product obtained in its crude state contained 24% phosphorus. The theoretical value is 33% if the reaction proceeds as follows.

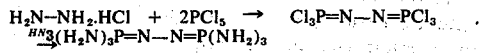

A chlorine residue which seems to persist indicates the probability of this material being a salt, probably a hydrochloride salt.

This white powder is very soluble in water and appears to form a complex with silver nitrate. Its aqueous solution is slightly alkaline. The only other solvent found to date is ethylene glycol. The material does not melt up to 350°C. but some change occurs, since a crystalline substance was noticed on the walls of the melting point tube above the bath level.

A slurry of 34.3 g (0.5 m) of hydrazine monohydrochloride and 208.5 g (1.0 m) of $PCl_5$ in 500 ml of benzene was stirred and heated at reflux for 17 hours. After the first half hour of reflux, most of the solids had dissolved, and the surface of the yellow solution was covered with small bubbles like a foam. Hydrogen chloride gas was detected at the end of the drying tube atop the condenser. The reaction mixture was cooled, and the dissolved hydrogen chloride and most of the solvent were removed under vacuum leaving a white solid which is $Cl_3P=N—N=PCl_3$.

The solid was slurried with 500 ml of chloroform, and 1200 ml of liquid ammonia was added cautiously with stirring. The ammonia was contained by a Dry Ice condenser for at least 6 hours; then, it was allowed to evaporate overnight. The resultant white solid was allowed to settle. A portion of the supernatant liquid left no residue upon evaporation indicating the insolubility of the product in chloroform.

Two hundred and nineteen grams (3 m) of diethylamine was added to the slurry which was heated to reflux and kept there for 23 hours for the purpose of converting the by-product ammonium chloride to soluble diethylamine hydrochloride and ammonia. The resulting slurry was filtered, and the white filter cake was washed with 750 ml of chloroform in 250 ml portions. Air drying followed by vacuum drying at room temperature yielded 121.1 g of product. The infrared spectrum of this material showed strong —NH absorption, a strong band at 8.1$\mu$ and a weaker but broader band at 10.7$\mu$. An aqueous solution of the product was weakly alkaline. The material was insoluble in chloroform, acetone and cold methanol.

| % | Found |
|---|---|
| H | — |
| N | 37.80 |
| P | 24.42 |
| Cl | 13.73 |

A thermogravimetric analysis revealed that nearly 41% of the material was lost between 25° and 300°C., but from 300°–715°C. only 3% additional weight loss occurred in helium. In air, the weight loss was similar, but from 650°–900°C. another 14% was lost.

Treatment of Fabrics

A solution containing the desired weight percent of the product in sufficient water to just saturate the cloth was poured on a weighed piece of cloth lying flat in a plastic bag. The solution was worked over the surface of the cloth, until it was uniformly wet. After standing for about fifteen minutes, the cloth was placed in an oven at the desired temperature and cured. After curing and drying, the cloth was allowed to equilibrate before being weighed.

Cure Conditions

Cure was effected at 140°C. using the one operation to also dry the wet sample. Formaldehyde and magnesium chloride catalyst were included in the treatment in some instances to see if this supplemental treatment made the material more durable to washing.

Flammability Tests

Samples of cloth 10 in. × 3½ in. were clamped in a metal stand and tested according to AATCC Test Method 34-1969 using a propane torch in place of the special gas mixture. This flammability test is described in J. Amer. Assoc. Text. Chem. and Colorists 2 (3), 49/19 (1970).

Tabulation of Data

The test data are tabulated in the following table. The table is divided into three main sections: Fabric Treatment, Flammability Tests and Miscellaneous Conditions. The following column headings are used. The added notes are for explanation of their meanings where not self explanatory.

| Column | Heading | Explanation |
|---|---|---|
| 1 | Cloth Type | |
| 2 | Reagent | *$Cl_3P=N-N=PCl_3$+$NH_3$ product |
| 3 | Auxiliary | material used to bind to cloth such as formaldehyde and catalyst; TMM = trimethylolmelamine and catalyst |
| 4 | % Final Add-On | weight percent of product added to the cloth after all processes including laundering if indicated in column 9 |
| 5 | Distance Burned, in. | this represents the length of the sample that was burned out, charred or scorched from the ignited edge |
| 6 | Time, Sec | time from ignition to removal of flame even though self extinguishment had already occurred |
| 7 | Self Extinguish (SE) | answers question — Did the fire self extinguish before burning the entire sample length |
| 8 | Cure Temperature | Y = yes; N = no temperature at which the wet cloth was dried and cured in a single operation |
| 9 | Post Treatment | indicates treatment of sample after curing but before flammability test L = laundered, detergent wash & dried NL = not laundered |

| | Fabric Treatment | | | Flammability Test | | | Miscellaneous Conditions | |
|---|---|---|---|---|---|---|---|---|
| Cloth Type | Reagent | Auxiliary | % Final Add-On | Distance Burned, in. | Time Sec | SE | Cure Temp °C | Post Treatment |
| 65/35 polyester/cotton | * | — | 19.0 | 5 | 5–30 | Y | 140 | NL |
| 65/35 polyester/cotton | * | — | 12.15 | 5 | 5—30 | Y | 140 | L |
| cotton | * | — | 13.2 | 4 | 5–30 | Y | 140 | NL |
| cotton | * | — | 5.0 | 4 | 5–30 | Y | 140 | L |
| cotton | * | $CH_2O$, $MgCl_2$ | 5.4 | 10 | 10 | N | 140 | L |
| 65/35 polyester/cotton | * | $CH_2O$, $MgCl_2$ | 6.67 | 6 | 6–30 | Y | 140 | L |
| 100 polyester[1] | * | — | 27.9 | | | Y | 140 | NL |
| 100 polyester[2] | * | — | 11.1 | | | Y | 140 | L |
| 100 polyester[2] | * | $CH_2O$, $MgCl_2$ | 35.0 | melts | | Y | 140 | NL |
| 100 polyester[2] | * | $CH_2O$, $MgCl_2$ | 8.1 | melts | | Y | 140 | L |
| cotton | * | $CH_2Cl_2$ | 10.6 | 5 | 30 | Y | 140 | L |
| cellulose sponge[3] | * | $CH_2O$, $MgCl_2$ | 19.5 | | | Y | 140 | L |
| wool | * | — | | 3 | 45 | Y | 140 | L |
| 100 polyester[4] | * | — | 18.0 | 3 | | Y | 140 | NL |
| 100 polyester[5] | * | — | 4.7 | | | N | 140 | L |
| cotton[6] | * | — | 5.8 | 3½ | 30 | Y | 140 | L |
| cotton[6] | * | — | 5.8 | 2⅜ | 30 | Y | 140 | L |

*$Cl_3P=N-N=PCl_3$+$NH_3$ product
SE = Self Extinguishing
Y = Yes
NL = Not Laundered
N = No
L = Laundered

[1] Melts and shrinks in flame, does not burst into flame
[2] No flaming when removed from burner
[3] Charred and smoked but failed to ignite, some intumescence
[4] Melted, but no dripping
[5] Burned with tendency to extinguish
[6] Same sample on different end Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. It is obvious from the data in the table that since the flame-retardant is operable on cotton, polyester and 65/35 polyester cotton, that the flame-retardant will also be operable on 50/50 polyester/cotton, 30 to 70% by weight cotton in a cotton/polyester blend and, in fact, for any blend of cotton and polyester. For example, effectiveness has been shown on cellulose sponge and it would be expected that other types of cellulose such as cellulosic paper would be protected. Accordingly, modifications are contemplated which can be made without departing from the spirit of the described invention.

What I claim is:

1. A process for making flame-retardant material from cellulose, cotton, paper or cellulose sponge, polyester, wool of blends thereof comprising treating said material with an aqueous solution of a product of $Cl_3P=N—N=PCl_3$ reacted with anhydrous ammonia in excess over that required to combine with all the chlorine atoms in sufficient amount and curing the treated material at a sufficient temperature to make the treated and cured material self-extinguishing when subjected to a flame sufficient to ignite and consume the untreated material.

2. A process of claim 1 wherein said material comprises cotton.

3. A process of claim 1 wherein said material comprises about 50% by weight polyester and 50% by weight cotton.

4. A process of claim 1 wherein said material comprises polyester.

5. A process of claim 1 wherein said material comprises about 65% by weight polyester and 35% by weight cotton.

6. A process of claim 1 wherein said material comprises wool.

7. A flame-retardant material made by the process of claim 1.

8. A process of claim 1 wherein said material comprises cellulose.

9. A process of claim 1 wherein said material comprises about 30 to 70% by weight cotton and about 70 to 30% by weight polyester.

* * * * *